US008519881B2

(12) United States Patent
Park et al.

(10) Patent No.: US 8,519,881 B2
(45) Date of Patent: Aug. 27, 2013

(54) UNIVERSAL REMOTE CONTROL APPARATUS, SYSTEM FOR CONTROLLING UNIVERSAL REMOTE CONTROL, AND METHOD FOR THE SAME

(75) Inventors: Sang Do Park, Seoul (KR); Jun Hyeong Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 995 days.

(21) Appl. No.: 11/936,114

(22) Filed: Nov. 7, 2007

(65) Prior Publication Data

US 2009/0058708 A1 Mar. 5, 2009

(30) Foreign Application Priority Data

Sep. 3, 2007 (KR) ........................ 10-2007-0089085

(51) Int. Cl.
*H04L 17/02* (2006.01)

(52) U.S. Cl.
USPC ........... 341/176; 348/725; 715/748; 715/762; 715/864; 725/38

(58) Field of Classification Search
USPC .............. 178/4.1 R; 715/705, 716, 730, 761, 715/762, 764, 864, 866, 748; 345/168, 173; 725/2-4, 14, 38, 78; 348/14.03, 14.05, 725; 341/176, 22
See application file for complete search history.

(56) References Cited

U.S. PATENT DOCUMENTS

| | | | | |
|---|---|---|---|---|
| 6,157,319 | A * | 12/2000 | Johns et al. | 340/12.24 |
| 7,047,495 | B1 * | 5/2006 | Pang | 715/736 |
| 7,574,691 | B2 * | 8/2009 | Freitas et al. | 717/113 |
| 7,579,961 | B2 * | 8/2009 | Krzyzanowski et al. | 340/825.72 |
| 7,814,510 | B1 * | 10/2010 | Ergen et al. | 725/38 |
| 2005/0024226 | A1 * | 2/2005 | Hayes et al. | 340/825.22 |
| 2007/0176820 | A1 * | 8/2007 | Vidal | 341/176 |

FOREIGN PATENT DOCUMENTS

| | | | |
|---|---|---|---|
| JP | 2002-016990 | * | 1/2002 |
| JP | 2002-016990 | A | 1/2002 |
| JP | 2004-229307 | A | 8/2004 |
| KR | 10-2004-0067686 | A | 7/2004 |
| KR | 10-2006-0022441 | A | 3/2006 |
| KR | 10-2006-0099989 | A | 9/2006 |

* cited by examiner

*Primary Examiner* — Albert Wong
(74) *Attorney, Agent, or Firm* — Sughrue Mion, PLLC

(57) ABSTRACT

A universal remote control apparatus, a system for controlling a universal remote control, and a method for the same, and more particularly, to a universal remote control apparatus, a system for controlling a universal remote control, and a method for the same, which includes batch instruction information having graphical user interface (GUI) components corresponding to status information of at least one device, and provides the GUI adapting mechanical properties of the device to a user.

21 Claims, 5 Drawing Sheets

UNIVERSAL REMOTE CONTROL APPARATUS, SYSTEM FOR CONTROLLING UNIVERSAL REMOTE CONTROL, AND METHOD FOR THE SAME

CROSS-REFERENCE TO RELATED APPLICATION

This application claims the benefit of Korean Patent Application No. 10-2007-0089085, filed on Sep. 3, 2007, in the Korean Intellectual Property Office, the disclosure of which is incorporated herein by reference.

BACKGROUND OF THE INVENTION

1. Field of the Invention

The present invention relates to a universal remote control apparatus, a system for controlling a universal remote control, and a method for the same, and more particularly, to a universal remote control apparatus, a system for controlling a universal remote control, and a method for the same, which includes batch instruction information having graphical user interface (GUI) components corresponding to status information of at least one device, and provides the GUI adapting mechanical properties of the device to a user.

2. Description of Related Art

In general, a remote control is an electronic device used for the remote operation of a machine. Commonly, the electronic devices controlled by the remote controls have their own remote controls, and the remote controls are used to issue control commands at a distance from a device to be controlled through infrared (IR) signals and via radio signals using frequencies. However, as a number of devices to be controlled increases, the handling and management of each corresponding remote control for the devices are accompanied by a considerable need for attentiveness and increased burdens owing to an increase in a number of corresponding remote controls. Specifically, when the devices to be controlled have mechanical properties different from one another, instinctive and effective control for the devices is difficult to be performed due to differences in user interfaces of the corresponding remote controls. Also, when the devices to be controlled are manufactured by different manufacturers, their compatibility with other applications becomes impossible. Accordingly, each remote control for each device to be controlled is needed to control each device, as necessary, even though users are suffering from inconvenience and burdens due to the increase in the number of remote controls.

In this regard, in order to overcome the above mentioned-problems, the manufacturers of the electronic devices have been developed a touch screen-based universal remote control capable of controlling their own manufacturer's various products with one remote control, however, the universal remote control cannot be used for controlling other manufacturer's products. Also, the conventional universal remote control still has a problem in that a fixed type graphical user interface (GUI) is required to be provided in spite of employing batch instructions using a touch screen and a macro.

FIG. 1 is a configuration diagram illustrating a universal remote control apparatus having a conventional fixed type GUI. Referring to FIG. 1, the conventional universal remote control apparatus 110 includes a fixed type GUI database 111 for storing GUI components, and a user interface 112 for displaying the GUI components to a user. The conventional universal remote control apparatus 110 displays only GUI component information stored in the universal remote control apparatus 110 in the user interface 112, regardless of mechanical properties of at least one device 120, and thus flexibility and expandability of the universal control apparatus 110 is deteriorated.

SUMMARY OF THE INVENTION

An aspect of the present invention provides a universal remote control apparatus which acquires graphical user interface (GUI) component information including status information of a device to be controlled so as to perform a batch instruction, and dynamically generates required GUI components so as to control the device.

An aspect of the present invention provides a universal remote control apparatus which improves intuitiveness for a user and usability of a device to be controlled by dynamically showing status information of the device.

An aspect of the present invention also provides a system for controlling a universal remote control which acquires GUI components from a device storing the GUI components so as to control the device.

An aspect of the present invention provides a system for controlling a universal remote control which improves convenience of a user while improving flexibility and expandability of the universal remote control apparatus, by dynamically generating GUI components required for controlling a device to be controlled.

According to an aspect of the present invention, there is provided a universal remote control apparatus including a device recognition unit for recognizing at least one device, and acquiring device status information from the recognized device; a batch instruction generation unit for generating batch instruction information from the device status information; a batch instruction database for storing and/or maintaining the batch instruction information; a user interface implementation unit for combining graphical user interface (GUI) components and displaying the combined GUI components; and a control unit for generating menu information with respect to the GUI components, storing the generated menu information in the batch instruction database, and executing the batch instruction information including a batch instruction.

According to an aspect of the present invention, there is provided a system for controlling a universal remote control, the system including a device including a GUI database for storing and maintaining GUI components; and a universal remote control apparatus for acquiring the GUI components from at least one device and dynamically controlling the at least one device through the GUI components, wherein the universal remote control apparatus comprises: a device recognition unit for recognizing the device and acquiring device status information from the recognized device; a batch instruction generation unit for generating batch instruction information from the device status information; a batch instruction database for storing and/or maintaining the batch instruction information; a user interface implementation unit for combining the GUI components and displaying the combined GUI components; and a control unit for generating menu information with respect to the GUI components, storing the generated menu information in the batch instruction database, and executing the batch instruction information including a batch instruction.

According to another aspect of the present invention, there is provided a method of controlling a remote control for a device, the method including recognizing at least one device in a device acquisition unit, and acquiring device status information from the recognized device; generating, in a batch instruction generation unit, batch instruction information from the device status information; and combining, in a user interface implementation unit, GUI components from the batch instruction information, and displaying the combined GUI components.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
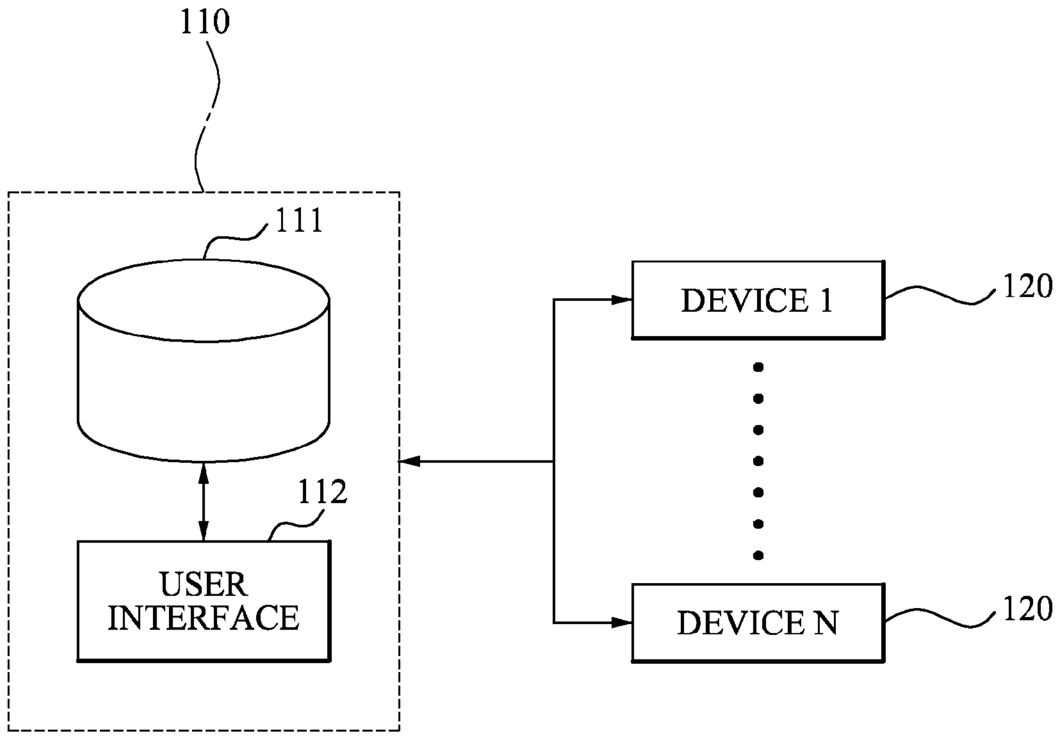
FIG. 1 is a configuration diagram illustrating a universal remote control apparatus having a conventional fixed type graphical user interface (GUI)

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When detailed descriptions related to a well-known related function or configuration are determined to make the spirits of the present invention ambiguous, the detailed descriptions will be omitted herein. Also, terms used throughout the present specification are used to appropriately describe exemplary embodiments of the present invention, and thus may be different depending upon a user and an operator's intention, or practices of application fields of the present invention. Therefore, the terms must be defined based on descriptions made through the present invention.

A remote control apparatus according to an exemplary embodiment of the present invention is commonly called an apparatus for remotely controlling a device to be controlled, which may include a specified communication module such as a code division multiplexing access (CDMA) module, Bluetooth module, an infrared data association (IrDA), or a wired/wireless local area network (LAN) card, like a personal digital assistant (PDA), a smart phone, a handheld personal computer (PC), a cellular phone, a motion pictures experts group layer 3 (MP3) player, and the like, and have a specified microprocessor mounted therein to perform predetermined operations.

Figure 2:
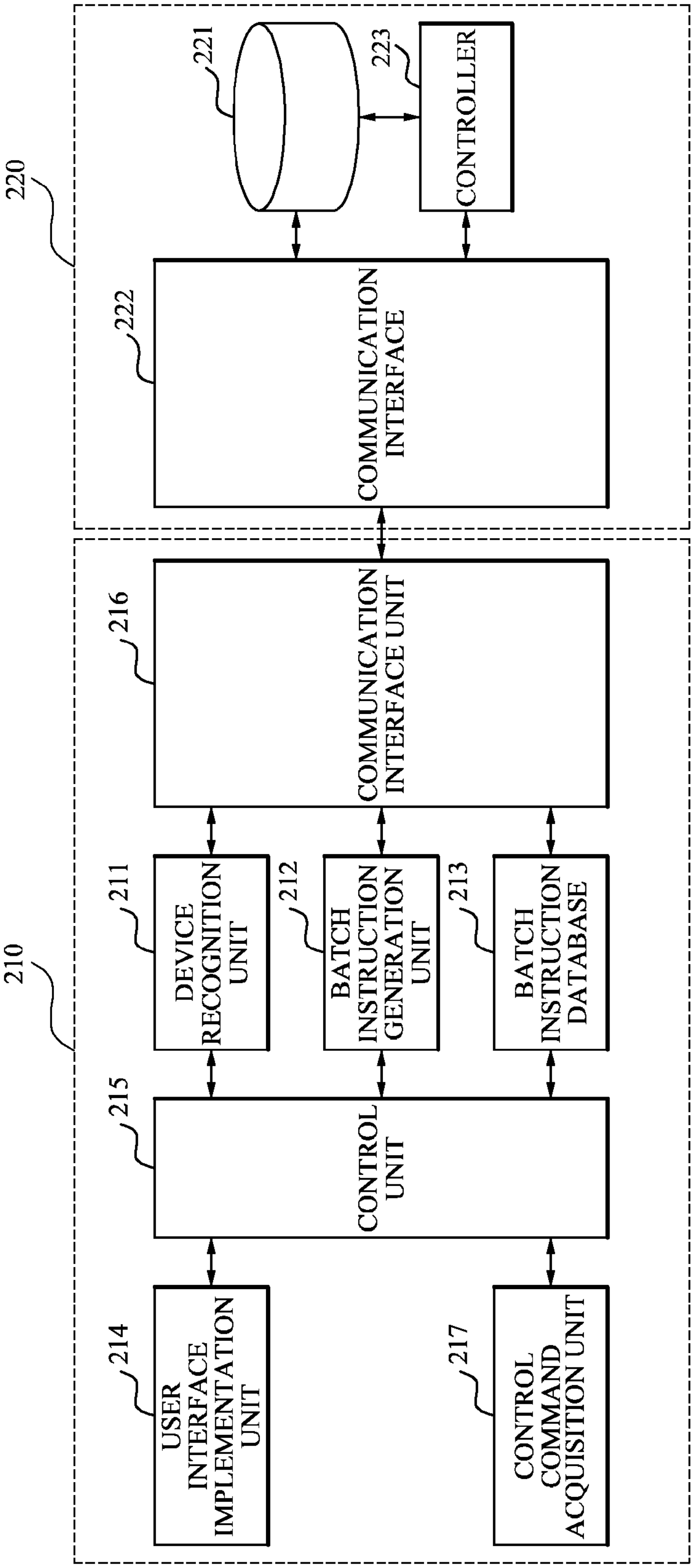
FIG. 2 is a diagram illustrating configuration components of a system for controlling a universal remote control including a universal remote control apparatus according to an exemplary embodiment of the present invention.

FIG. 2 is a diagram illustrating configuration components of a system for controlling a universal remote control including a universal remote control apparatus according to an exemplary embodiment of the present invention.

Referring to FIG. 2, a system for controlling a universal remote control according to an exemplary embodiment of the present invention comprises a device 220 including a graphical user interface (GUI) database 221 for storing and maintaining GUI components, and a universal remote control apparatus 210 which acquires the GUI components from at least one device 220, and dynamically controls the at least one device 220 through the GUI components.

The device 220 which is an object to be controlled by the universal remote control apparatus 210 reads the GUI components from the GUI database 221 storing the GUI components, and provides the read GUI components to the universal remote control apparatus 210 via a communication interface 222. According to the present exemplary embodiment of the invention, the GUI database 221 is generally included in the device 220, however, may be included in the device 220 and/or the universal remote control apparatus 210.

The universal remote control apparatus 210 generates and/or executes batch instruction information based on status information with respect to the device 220, and combines and displays the GUI components from the device 220. To this end, the universal remote control apparatus 210 according to the present exemplary embodiment of the invention comprises a device recognition unit 211, a batch instruction generation unit 212, a batch instruction database 213, a user interface implementation unit 214, a control unit 215, a communication interface unit 216, and a control command acquisition unit 217.

The device recognition unit 211 recognizes at least one device 220, and acquires the device status information from the recognized device 220. When the devices 220 are connected with each other via a wired/wireless network which is different from direct connection therebetween, the device 220 is recognized via the communication interface unit 216.

The batch instruction generation unit 212 generates batch instruction information from the device status information, and the batch instruction database 213 stores and/or maintains the batch instruction information. The batch instruction information includes GUI component information corresponding to the device status information, and the GUI component information includes tag information with respect to status of the device 220 where GUI components are used.

The control unit 215 generates menu information with respect to the GUI components and stores the generated menu information in the batch instruction database 213. The control unit 215 analyzes priority information with respect to the GUI components, and stores a GUI component having a highest priority in the menu information. Also, the control unit 215 executes batch instruction information including a batch instruction stored in the batch instruction database 213, in response to a user request for executing the batch instruction.

The communication interface unit 216 acquires the device status information and/or the GUI components from the at least one device connected with each other via a wired/wireless network.

The user interface implementation unit 214 combines GUI components and displays the combined GUI components. The user interface implementation unit 214 acquires the GUI components from the device 220 based on the status information tag with respect to the GUI components capable of controlling the device, and displays the acquired GUI components. Also, the user interface implementation unit 214 combines the acquired GUI components from the device 220, and displays the combined GUI components.

Specifically, operations of configuration components of the universal remote control apparatus according to the present exemplary embodiment of the invention will be hereinafter described in detail. The device recognition unit 211 recognizes at least one device 220 connected with each other via the wired/wireless network, and acquires device status information from the recognized device 220. Next, the instruction generation unit 212 generates batch instruction information from the device status information. Since the batch instruction information includes status information of a status into which the at least one device 220 is changed, the universal remote control apparatus 210 predicts status of a device will be changed when executing the batch instruction information. When the batch instruction information is executed, GUI components of the device 220 to be controlled vary according to the status information of the status from which the device 220 is changed. Specifically, since the batch instruction information includes GUI component information corresponding to the device status information, and the GUI component information includes device status information which is designated by the GUI components capable of controlling the device 220, that is, the status information tag with respect to the GUI components, the user interface implementation unit 214 acquires the GUI components from the device 220 via the communication interface unit 216 based on the status information tag with respect to the GUI components, and combines and displays the GUI components. Specifically, status information with respect to the device 220 to be controlled is dynamically shown, thereby improving intuitiveness of a user and usability of the device. Also, GUI components required for controlling the device 220 to be controlled are dynamically generated, thereby improving convenience of a user while improving flexibility and expandability of the universal remote control apparatus 210. The control unit 215 generates menu information with respect to the GUI components acquired from the device 220, and stores the generated menu information in the batch instruction database 213.

Referring again to FIG. 2, the control unit 215 analyzes priority information with respect to the GUI components, stores a GUI component having a highest priority in the menu information, and executes batch instruction information including a batch instruction. The GUI components may include the priority information in a tag scheme using a language such as extensible markup language (XML). Specifically, when the at least one device 220 provides competing GUI components, the GUI component having the highest priority from among the competed GUI components is stored in the menu information, and the GUI components having the highest priority are combined in the user interface implementation unit 214. When executing subsequent batch instructions via menu information with respect to GUI components stored in the batch instruction database 213, the configuration of the GUI components may be readily realized without performing a discovery process for re-recognizing the device 220.

The control command acquisition unit 217 acquires a control command from a user. The control command includes a generation information input of the batch instruction from the user. Specifically, the control command includes information with respect to generation of the batch instruction from the user, and the batch instruction generation unit 212 generates batch instruction information corresponding to the generation information input. That is, the user selects generation information capable of generating and/or executing the batch instruction, through the control command, and controls the device 220 to be controlled while the device 220 is in a predetermined status. In this case, the batch instruction information may include status information of a status into which the at least one device 220 is changed. Also, the control unit 215 reads the batch instruction information from the batch instruction database 213 according to the generation information input, and the user interface implementation unit 214 combines the GUI components from the read batch instruction information and displays the combined GUI components.

Figure 3:
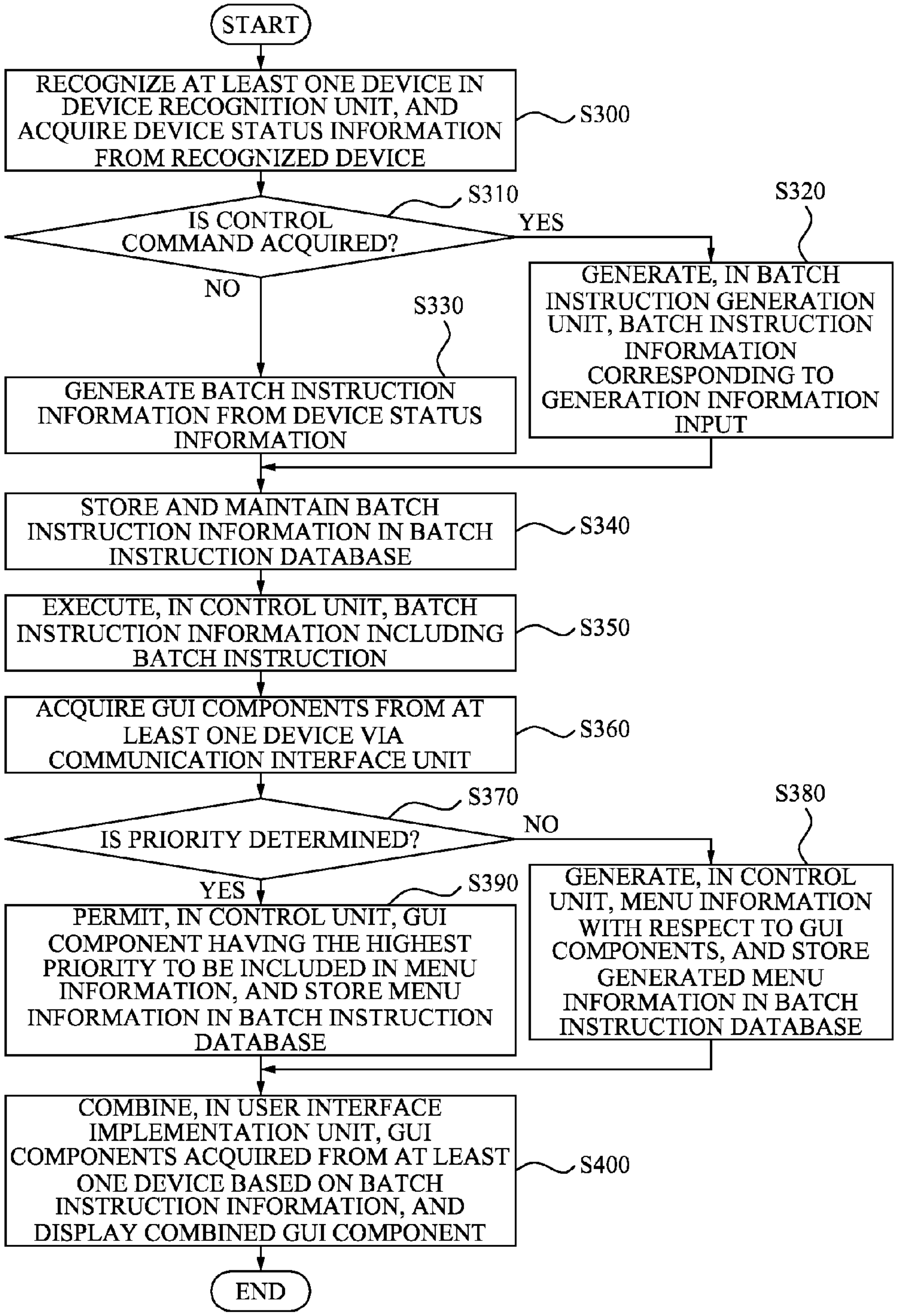
FIG. 3 is a flowchart illustrating a method for controlling a universal remote control using a universal remote control apparatus according to an exemplary embodiment of the present invention.

FIG. 3 is a flowchart illustrating a method for controlling a universal remote control using a universal remote control apparatus according to an exemplary embodiment of the present invention.

Referring to FIG. 3, in operation S300, the device recognition unit of the universal remote control apparatus recognizes at least one device, and acquires device status information from the recognized device.

Next, in operation S310, the universal remote control apparatus determines whether the control command is acquired from a user. The control command includes the generation information input of the batch instruction from the user. In operation S330, when the control command is acquired from the user, the batch instruction generation unit 212 generates batch instruction information corresponding to the generation information input. The batch instruction information includes GUI component information corresponding to device status information, and the GUI component information includes tag information with respect to device status which is designated by the GUI components capable of controlling the device, that is, a status information tag with respect to the GUI components capable of controlling the device. Specifically, the user generates the batch instruction information through the control command. Next, in operation S340, the batch instruction database 221 stores and maintains the generated batch instruction information. However, when the control command including the generation information input of the batch instruction is not acquired from the user in operation S310, that is, when a command for executing a specified batch instruction or detailed command with respect to the command is not acquired from the user, the batch instruction information is generated from the device status information in operation S320. Since the batch instruction information includes status information of a status into which at least one device is changed, the status of the device into which the at least one device is changed is predicted by executing the batch instruction information.

Next, in operation S340, the batch instruction database stores and maintains the generated batch instruction information, and in operation S350, the control unit 215 executes the batch instruction information including the batch instruction. When executing the batch instruction information, GUI components of the device to be controlled vary according to the status information of a status into which the device is changed.

Next, in operation S360, the communication interface unit 216 acquires GUI components from the at least one device, and in operation S370, when the GUI components acquired from the at least one device provide an identical function, the control unit 215 analyzes and determines priority information with respect to the GUI components. The GUI components may include priority information in a tag scheme using a language such as XML. That is, when the at least one device 220 provides competing GUI components, a GUI component having a highest priority out of the competed GUI components is stored in the menu information, and the GUI component and non-competing components are combined in the user interface implementation unit 214. In operation S390, when the GUI components provide an identical function, the control unit 215 permits the GUI component having the highest priority to be included in the menu information, and stores the menu information in the batch instruction database 213. However, in operation S380, when the GUI components do not provide an identical function and the function is not overlapped with each other, the control unit 215 generates menu information with respect to the GUI components, and stores the generated menu information in the batch instruction database 213. The menu information with respect to the GUI components stored in the batch instruction database 213 simplifies configuration of the GUI components without performing a discovery process for newly recognizing the device upon executing the subsequent batch instruction.

Next, in operation S400, the user interface implementation unit 214 combines the GUI components acquired from at least one device based on the batch instruction information, and displays the combined GUI component. Specifically, the batch instruction information includes device status information of a status into which the at least one device is changed, and GUI component information corresponding to the device status information. Since the GUI component information includes a status information tag with respect to the GUI components capable of controlling the device, the user interface implementation unit 214 acquires the GUI components from the device based on the status information tag, and combines and displays the acquired GUI components in operation S400.

Figure 4:
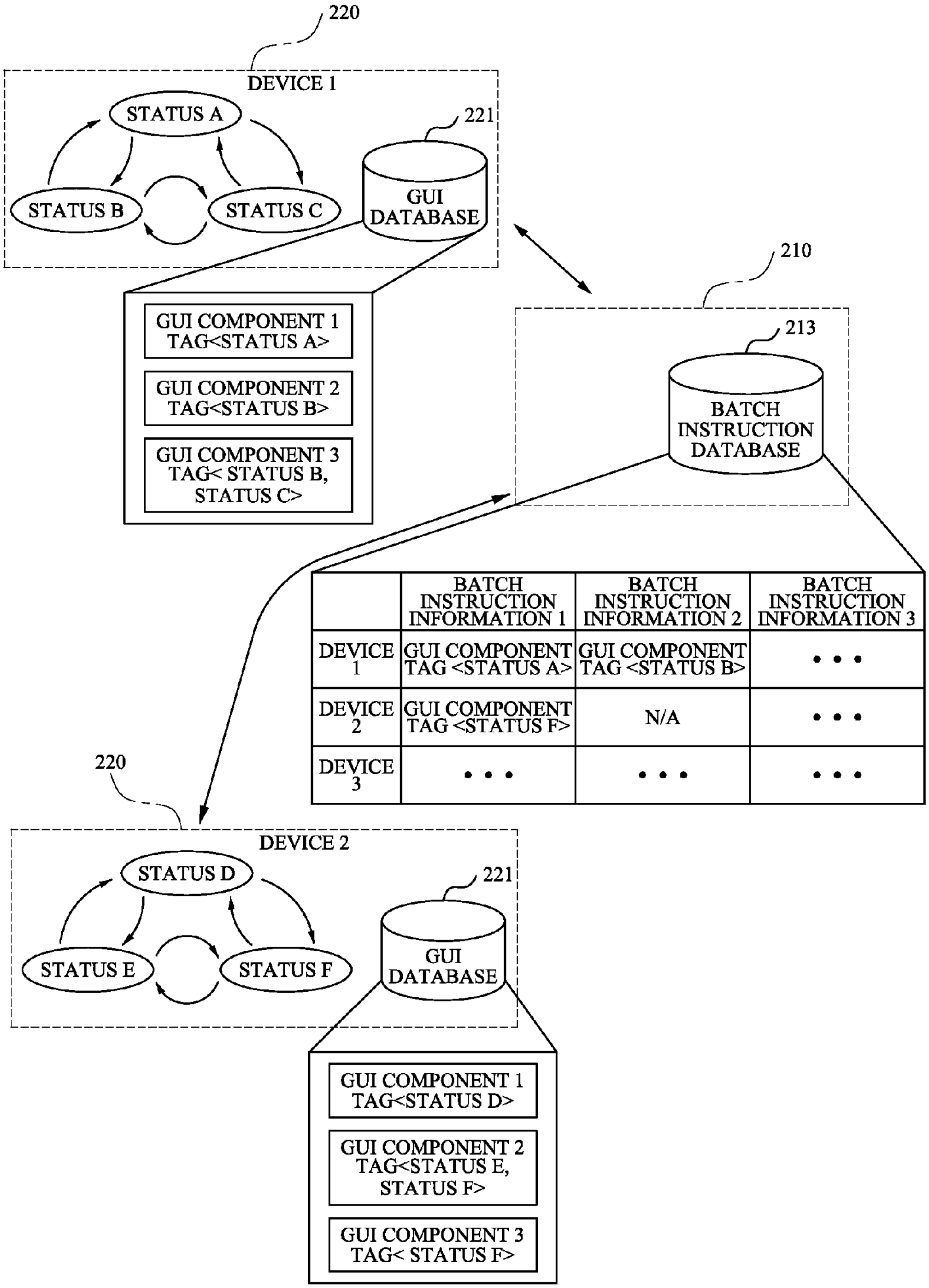
FIG. 4 is a diagram illustrating a process where GUI components of a universal remote control apparatus are generated in a system for controlling a remote control according to an exemplary embodiment of the present invention.

FIG. 4 is a diagram illustrating a process where GUI components of a universal remote control apparatus are generated in a system for controlling a remote control according to an exemplary embodiment of the present invention.

Referring to FIG. 4, the system for controlling the universal remote control comprises two devices 220 (device 1 and device 2) and a universal remote control apparatus 210. Device 1 may include three different statuses, that is, status A, status B, and status C. Since each of at least one GUI component information includes a tag with respect to the status information of device 1 as described above, GUI component 1 stored in a GUI database 221 of device 1 includes a tag with respect to status A, GUI component 2 stored in the same includes a tag with respect to status B, and GUI component 3 stored in the same includes respective tags with respect to status B and the status C. Similar to device 1, device 2 may include three different statuses, that is, status D, status E, and status F. GUI component 1 stored in another GUI database 221 of device 2 includes a tag with respect to status D, GUI component 2 stored in the other GUI database 221 includes respective tags with respect to status E and status F, and GUI component 2 stored in the other GUI database 221 includes a tag with respect to status F.

The universal remote control apparatus 210 recognizes device 1 and device 2, and acquires device status information from the recognized devices. Next, the batch instruction generation unit of the universal remote control apparatus 210 generates batch instruction information from the device status information. Next, the generated batch instruction information is stored and maintained in the batch instruction database 213. As can be seen in FIG. 4, each set of the batch instruction information changes device 1 and device 2 into each specific status. The batch instruction information includes combined information with respect to plural device statuses like batch 1, batch 2, batch 3, and the like. Specifically, batch 1 includes information by which device 1 is changed into status A, and device 2 is changed into status F. Also, in each set of the batch instruction information as illustrated in FIG. 4, batch 2 includes information by which device 1 is changed into status B.

That is, a user may select a generation information input capable of generating/executing the batch instruction information through a control command, and the batch instruction information includes device status information of a status into which at least one device is changed. Thus, when it is assumed that batch 1 included in the batch instruction information is executed, the universal remote control apparatus of the present exemplary embodiment of the invention acquires any one of GUI component 1 of device 1, GUI component 2 of device 2, or GUI component 3 of device 2 corresponding to batch 1, from device 1 and device 2 via a communication interface unit. The control unit of the universal remote control apparatus generates menu information with respect to the GUI components, and stores the generated menu information in the batch instruction database 213, and the user interface implementation unit combines any one of GUI component 1 of device 1, GUI component 2 of device 2, or GUI component 3 of device 3, and displays the combined GUI components. The menu information with respect to the GUI components stored in the batch instruction database facilitates to construct the GUI components without performing a discovery process for newly recognizing the device upon executing the subsequent batch instruction.

However, when device 1 and device 2 include GUI components providing an identical function in a specific status, the control unit of the universal remote control apparatus of the present exemplary embodiment of the invention analyzes and determines priority information with respect to the GUI components acquired from device 1 and device 2, and stores a GUI component having a highest priority in the menu information. Next, the user interface implementation unit combines and displays GUI components including the GUI component having the highest priority. The GUI component may include priority information in a tag scheme using a language such as XML.

Figure 5:
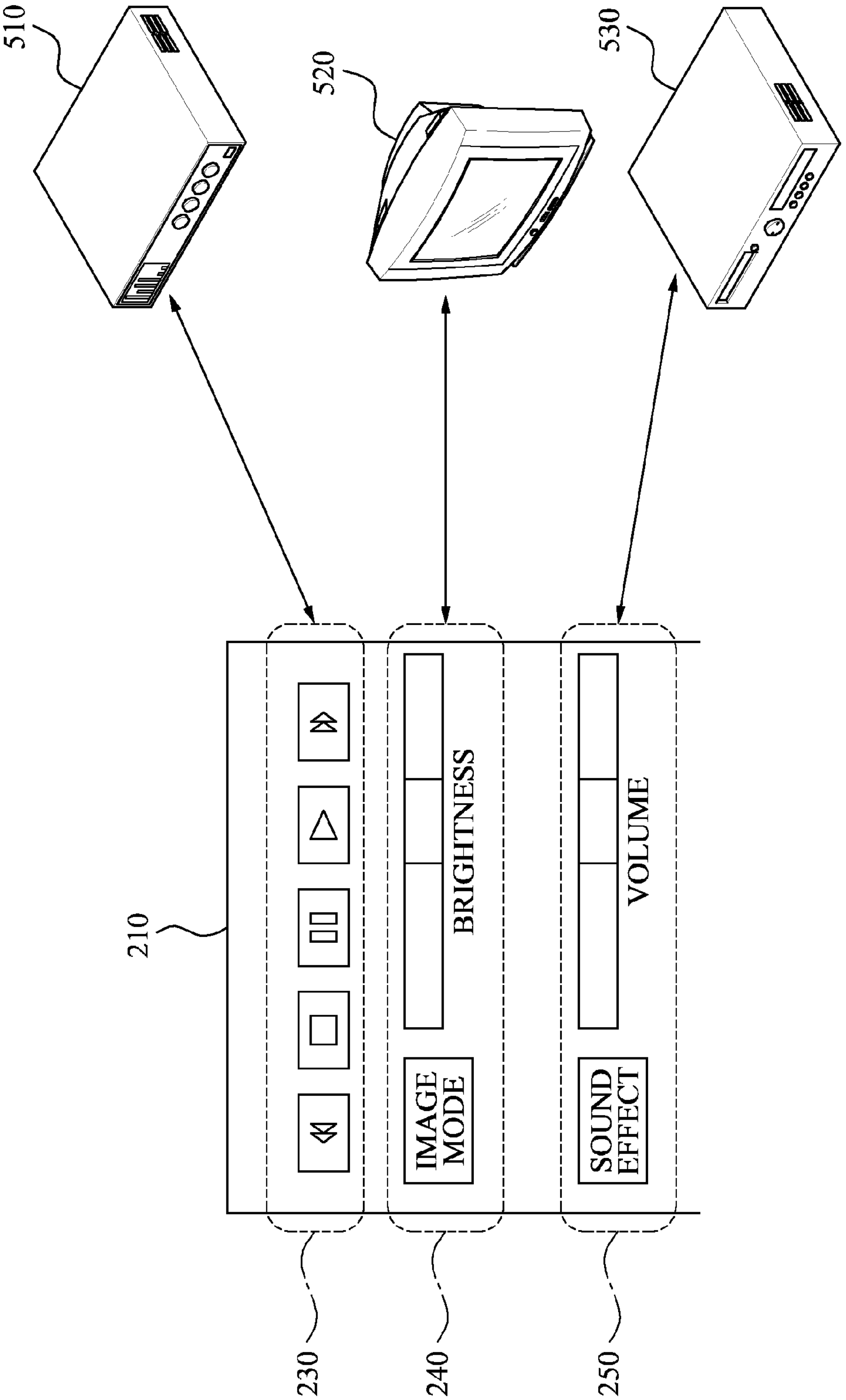
FIG. 5 is a diagram illustrating an example in which a device is recognized, and GUI components acquired from the device are implemented in a universal remote control apparatus according to an exemplary embodiment of the invention.

FIG. 5 is a diagram illustrating an example in which a device is recognized, and GUI components acquired from the device are implemented in a universal remote control apparatus according to an exemplary embodiment of the invention. Referring to FIG. 5, the universal remote control apparatus 210 recognizes devices such as a digital video disc (DVD) player 510, a television (TV) 520, and a receiver 530, and acquires device status information from the recognized DVD player 510, TV 520, and receiver 530. The universal remote control apparatus 210 generates and/or executes batch instruction information based on the device status information. Specifically, TV viewing, DVD viewing, and the like included in the batch instruction information capable of being executed are automatically executed, or the batch instruction information is executed by a control command of a user. For example, when the user selects the batch instruction information capable of executing a DVD viewing operation, the batch instruction information such as the DVD viewing includes status information of a status into which the DVD player 510, the TV 520, and the receiver 530 are changed, and the universal remote control apparatus 210 acquires GUI components associated with corresponding status information from the DVD player 510, the TV 520, and the receiver 530. Specifically, the DVD player 510 acquires the GUT components having a function for replaying the DVD, and the TV 520 acquires the GUI components having a function for displaying an image of the DVD replayed by the DVD player 510, and a function for improving sound effect of an image of the receiver 530. However, both of the TV 520 and the receiver

530 may have GUI components having a function for adjusting volume when executing the batch instruction such as the DVD viewing. The control unit of the universal remote control apparatus 210 analyzes and determines priority information with respect to the GUI components for adjusting volume acquired from the TV 520 and the receiver 530. In the above-mentioned example, the priority information with respect to the GUI component of the receiver 530 has a highest priority. Also, the priority information can be included in the GUI component using a language such as XML as mentioned above.

The universal remote control apparatus 210 analyzes and determines the priority information, and combines and displays GUI components having a highest priority. The control unit of the universal remote control apparatus 210 generates menu information with respect to the GUI components acquired from the DVD player 510, the TV 520, and a receiver 530, and stores the generated menu information in the batch instruction database 213. The user interface implementation unit of the universal remote control apparatus combines and displays a GUI component 230 having a function for replaying the DVD in the DVD player 510, a GUI component 240 having a function for controlling an image on the display of the TV 520, and a GUI component 250 having a function for controlling volume information of an image of the receiver 530. According to the present exemplary embodiment of the invention, the universal remote control apparatus may be applied to a home network having a complex device configuration such as the above-mentioned example, and different properties of respective devices based on each manufacturer and each device type may be adapted in the universal remote control apparatus.

The method of controlling a universal remote control according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

As described above, according to the present invention, the universal remote control apparatus can acquire GUI component information including device status information from a device to be controlled so as to execute a batch instruction, and dynamically generate required GUI components while executing the batch instruction, thereby controlling the device.

Also, according to the present invention, status information of a device to be controlled can be dynamically shown, thereby improving intuitiveness for a user and usability of the device.

Also, according to the present invention, the universal remote control system can acquire GUI components from a device storing the GUI components and the device, thereby controlling the device.

Also, according to the present invention, GUI components required for controlling a device to be controlled are dynamically generated, thereby improving convenience of a user while improving flexibility and expandability of the universal remote control apparatus.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A universal remote control apparatus comprising:

a device recognition unit for recognizing at least one device, and acquiring device status information from the recognized device;

a batch instruction generation unit for generating batch instruction information from the device status information;

a batch instruction database for storing and/or maintaining the batch instruction information;

a user interface implementation unit for combining graphical user interface (GUI) components and displaying the combined GUI components; and a control unit for generating menu information with respect to the GUI components, storing the generated menu information in the batch instruction database, and executing the batch instruction information including a batch instruction in response to a user request for executing the batch instruction, wherein the batch instruction information includes GUI component information corresponding to the device status information, wherein the GUI component information includes a status information tag with respect to the GUI components capable of controlling the device, and the user interface implementation unit acquires the GUI components from the device based on the status information tag, and displays the acquired GUI components on a display unit, wherein the device status information is source input mode information, and wherein the batch instruction is an instruction to obtain, from the at least one device, at least one GUI icon for a corresponding device status according to the status information tag.

2. The apparatus of claim 1, further comprising:

a communication interface unit for acquiring the device status information and/or the GUI components from the at least one device connected with each other via a wired/wireless network.

3. The apparatus of claim 1, wherein the user interface implementation unit combines the GUI components acquired from the device and displays the combined GUI components.

4. The apparatus of claim 1, wherein the control unit analyzes priority information with respect to the GUI components and stores a GUI component having a highest priority in the menu information.

5. The apparatus of claim 1, further comprising:

a control command acquisition unit for acquiring a control instruction.

6. The apparatus of claim 5, wherein the control command includes a generation information input of the batch instruction, and the batch instruction generation unit generates the batch instruction information corresponding to the generation information input.

7. The apparatus of claim 6, wherein the batch instruction information includes status information of a status into which the at least one device is changed.

8. The apparatus of claim 6, wherein the control unit reads the batch instruction information from the batch instruction database according to the generation information input, and the user interface implementation unit combines the GUI components from the read batch instruction information and displays the combined GUI components.

9. A system for controlling a universal remote control, the system comprising:

a device including a graphical user interface (GUI) database for storing and maintaining GUI components; and a universal remote control apparatus for acquiring the GUI components from at least one device and dynamically controlling the at least one device through the GUI components, wherein the universal remote control apparatus comprises:

a device recognition unit for recognizing the device and acquiring device status information from the recognized device;

a batch instruction generation unit for generating batch instruction information from the device status information;

a batch instruction database for storing and/or maintaining the batch instruction information;

a user interface implementation unit for combining the GUI components and displaying the combined GUI components; and a control unit for generating menu information with respect to the GUI components, storing the generated menu information in the batch instruction database, and executing the batch instruction information including a batch instruction in response to a user request for executing the batch instruction, wherein the batch instruction information includes GUI component information corresponding to the device status information, wherein the GUI component information includes a status information tag with respect to the GUI components capable of controlling the device, and the user interface implementation unit acquires the GUI components from the device based on the status information tag, and displays the acquired GUI components on a display unit, wherein the device status information is source input mode information, and wherein the batch instruction is an instruction to obtain, from the at least one device, at least one GUI icon for a corresponding device status according to the status information tag.

10. The system of claim 9, wherein the universal remote control apparatus further comprises a communication interface unit for acquiring the device status information and/or the GUI components from the at least one device connected with each other via a wired/wireless network.

11. The system of claim 9, wherein the universal remote control apparatus further comprises a control command acquisition unit for acquiring a control instruction.

12. A method of controlling a remote control for a device, the method comprising:

recognizing at least one device in a device acquisition unit, and acquiring device status information from the recognized device;

generating, in a batch instruction generation unit, batch instruction information from the device status information; and combining, in a user interface implementation unit, graphical user interface (GUI) components from the batch instruction information, and displaying the combined GUI components; and executing, in a control unit, the batch instruction information including a batch instruction, wherein the batch instruction information includes GUI component information corresponding to the device status information, wherein the GUI component information includes a status information tag with respect to the GUI components capable of controlling the device, wherein the combining includes acquiring, in the user interface implementation unit, the GUI components from the device based on the status information tag, and displaying the acquired GUI components, wherein the device status information is source input mode information, and wherein the batch instruction is an instruction to obtain, from the at least one device, at least one GUI icon for a corresponding device status according to the status information tag.

13. The method of claim 12, wherein the batch instruction information includes status information of a status into which to the at least one device is changed.

14. The method of claim 12, wherein the generating includes storing and maintaining the batch instruction information in a batch instruction database.

15. The method of claim 12, wherein the combining includes generating, in a control unit, menu information with respect to the GUI components, and storing the generated menu information in the batch instruction database.

16. The method of claim 15, further comprising:

acquiring the GUI components from the at least one device via a communication interface unit.

17. The method of claim 15, further comprising:

analyzing, in the control unit, priority information with respect to the GUI components, and storing a GUI component having a highest priority in the menu information.

18. The method of claim 12, further comprising:

acquiring a control instruction, wherein the control command includes a generation information input of the batch instruction from the user.

19. The method of claim 18, further comprising:

executing, in the batch instruction generation unit, the batch instruction information corresponding to the generation information input.

20. A non-transitory computer-readable recording medium storing a program for implementing the method of claim 12.

21. The apparatus according to claim 1, wherein the user interface implementation unit combines graphical user interface (GUI) components for a plurality of different devices connected to the universal remote control apparatus.

* * * * *